(12) United States Patent
Welch

(10) Patent No.: US 6,991,397 B2
(45) Date of Patent: Jan. 31, 2006

(54) DOWEL FASTENER AND JOINTS INCLUDING SAME

(75) Inventor: Montgomery J. Welch, Spring Lake, MI (US)

(73) Assignee: Modular Systems, Inc., Fruitport, MI (US)

(*) Notice: Subject to any disclaimer, the term of this patent is extended or adjusted under 35 U.S.C. 154(b) by 5 days.

(21) Appl. No.: 10/704,450

(22) Filed: Nov. 7, 2003

(65) Prior Publication Data

US 2005/0100399 A1    May 12, 2005

(51) Int. Cl.
*F16B 12/36* (2006.01)

(52) U.S. Cl. .................. 403/297; 403/292; 403/309; 403/313; 403/DIG. 11; 403/DIG. 13; 411/479

(58) Field of Classification Search .............. 403/292, 403/294, 297, 309, 313, DIG. 11, DIG. 13; 411/479
See application file for complete search history.

(56) References Cited

U.S. PATENT DOCUMENTS

| | | | |
|---|---|---|---|
| 252,311 A | 1/1882 | Goulding | |
| 423,666 A | 3/1890 | Bryant | |
| 815,055 A | 3/1906 | Weiss | |
| 825,069 A | 7/1906 | Peirce | |
| 1,287,678 A | 12/1918 | Hall | |
| 1,296,342 A | 3/1919 | Tozzi | |
| 1,360,884 A | 11/1920 | Cazenove | |
| 1,734,161 A | 11/1929 | Du Plessis | |
| 1,829,657 A | 10/1931 | Jones | |
| 1,850,713 A | 3/1932 | Fox | |
| 2,001,144 A | 5/1935 | Kmansky | 20/92 |
| 2,648,247 A | 8/1953 | Schmuziger | 85/8.3 |
| 3,314,699 A | 4/1967 | Taylor | 287/54 |
| 3,430,403 A | 3/1969 | Muse | 52/437 |
| 3,432,978 A | 3/1969 | Erickson | 52/227 |
| 3,442,170 A | 5/1969 | Roder et al. | 85/8.3 |

(Continued)

FOREIGN PATENT DOCUMENTS

DE    205452    9/1939

(Continued)

OTHER PUBLICATIONS

Brochure, "Whenever fastening problems arise . . . Consider Elastic Stop Nuts," by Elastic Stop Nut Corporation of America, Union, New Jersey (1952).

(Continued)

*Primary Examiner*—Daniel P. Stodola
*Assistant Examiner*—Michael P. Ferguson
(74) *Attorney, Agent, or Firm*—Van Dyke, Gardner, Linn & Burkhart, LLP

(57) ABSTRACT

An improved dowel fastener for compressive insertion within a recess, bore or aperture in each of two joint members of wood, metal, plastic or combinations thereof to frictionally retain one joint member to the other. The dowel fastener includes a flexible, resilient, tubular body having a preferably spiral slot extending from end to end and at least one and preferably two spaced tabs at positions along the slot. The tabs each extend from one slot edge across the slot toward the opposing slot edge and engage the inside surface of the tubular body adjacent the opposing slot edge. The body provides a cylindrical exterior gripping surface for engagement with the sides of the joint apertures and is sufficiently flexible for compression from its normal, uncompressed diameter for insertion in a smaller fastening aperture. The resiliency of the tubular body and the engagement of the tabs with the inside surface of the body resist compression for secure frictional engagement by the body exterior with the sides of the fastening apertures.

66 Claims, 4 Drawing Sheets

U.S. PATENT DOCUMENTS

| | | | |
|---|---|---|---|
| 3,512,034 A | 5/1970 | Jenkins | 313/354 |
| 3,826,206 A | 7/1974 | Ruggles | 108/64 |
| 3,903,669 A | 9/1975 | Pease, Jr. et al. | 52/455 |
| 4,012,913 A | 3/1977 | Scott | 61/45 |
| 4,067,165 A | 1/1978 | Timmons | 52/585 |
| 4,093,389 A | 6/1978 | Wilbrow | 403/280 |
| 4,158,335 A | 6/1979 | Belcastro et al. | 108/64 |
| 4,284,379 A | 8/1981 | Chaiko | 411/61 |
| 4,318,208 A | 3/1982 | Borja et al. | 24/305 |
| 4,474,493 A | 10/1984 | Welch | 403/405 |
| 4,892,432 A * | 1/1990 | Cooper | 403/297 |

FOREIGN PATENT DOCUMENTS

| | | |
|---|---|---|
| FR | 2159829 | 6/1973 |
| FR | 2370882 | 7/1978 |
| FR | 2724697 | 3/1996 |
| FR | 2724698 | 3/1996 |
| GB | 191416 | 1/1923 |
| GB | 575178 | 2/1946 |
| GB | 1025455 | 4/1966 |
| GB | 1427010 | 3/1976 |
| SE | 141055 | 6/1953 |

OTHER PUBLICATIONS

Photograph of compression dowel of the type described in U.S. Pat. No. 4,474,943 but also including a phosphate coating, manufactured and sold more than one year prior to the filing date of this application by Modular Systems, Inc., Fruitport, Michigan 49417.

* cited by examiner

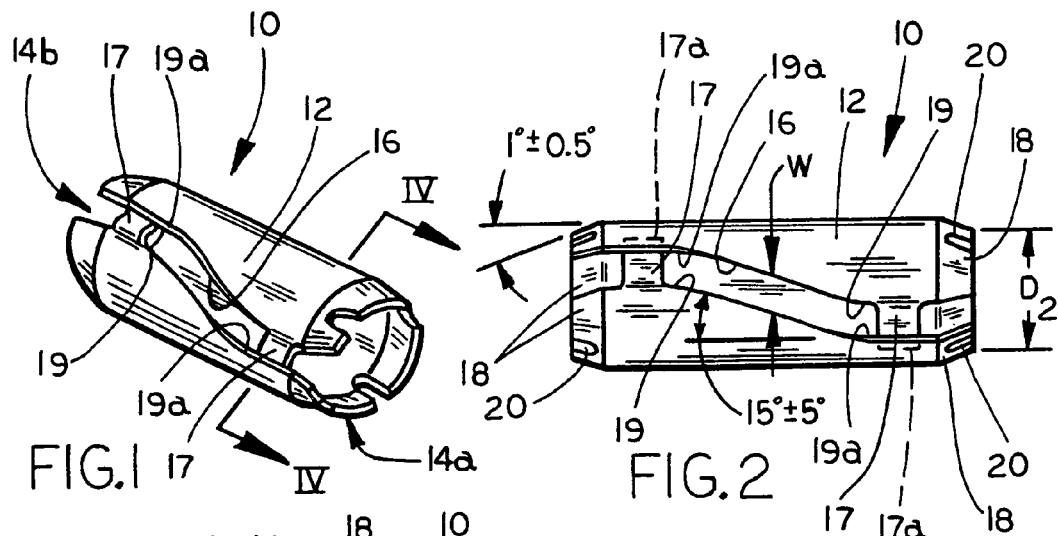
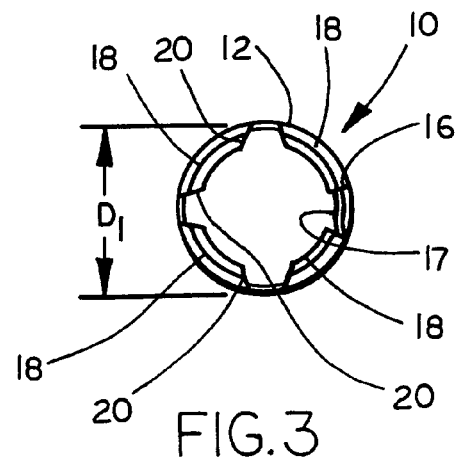
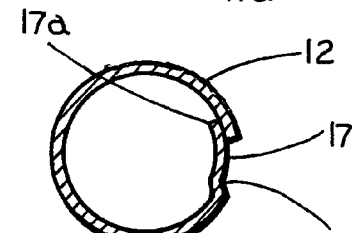
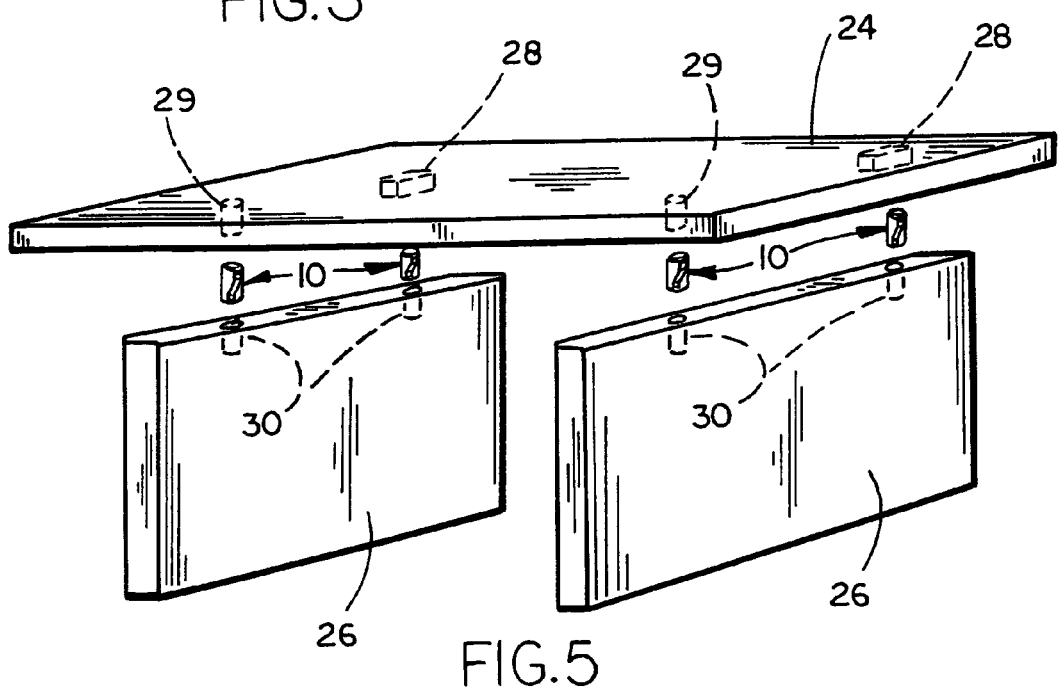

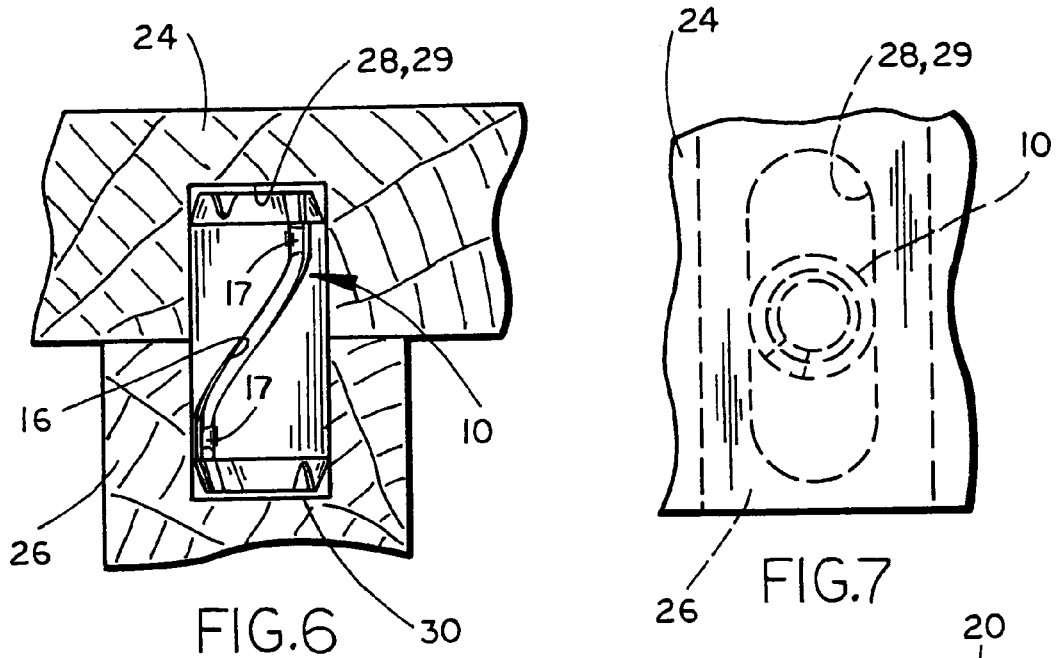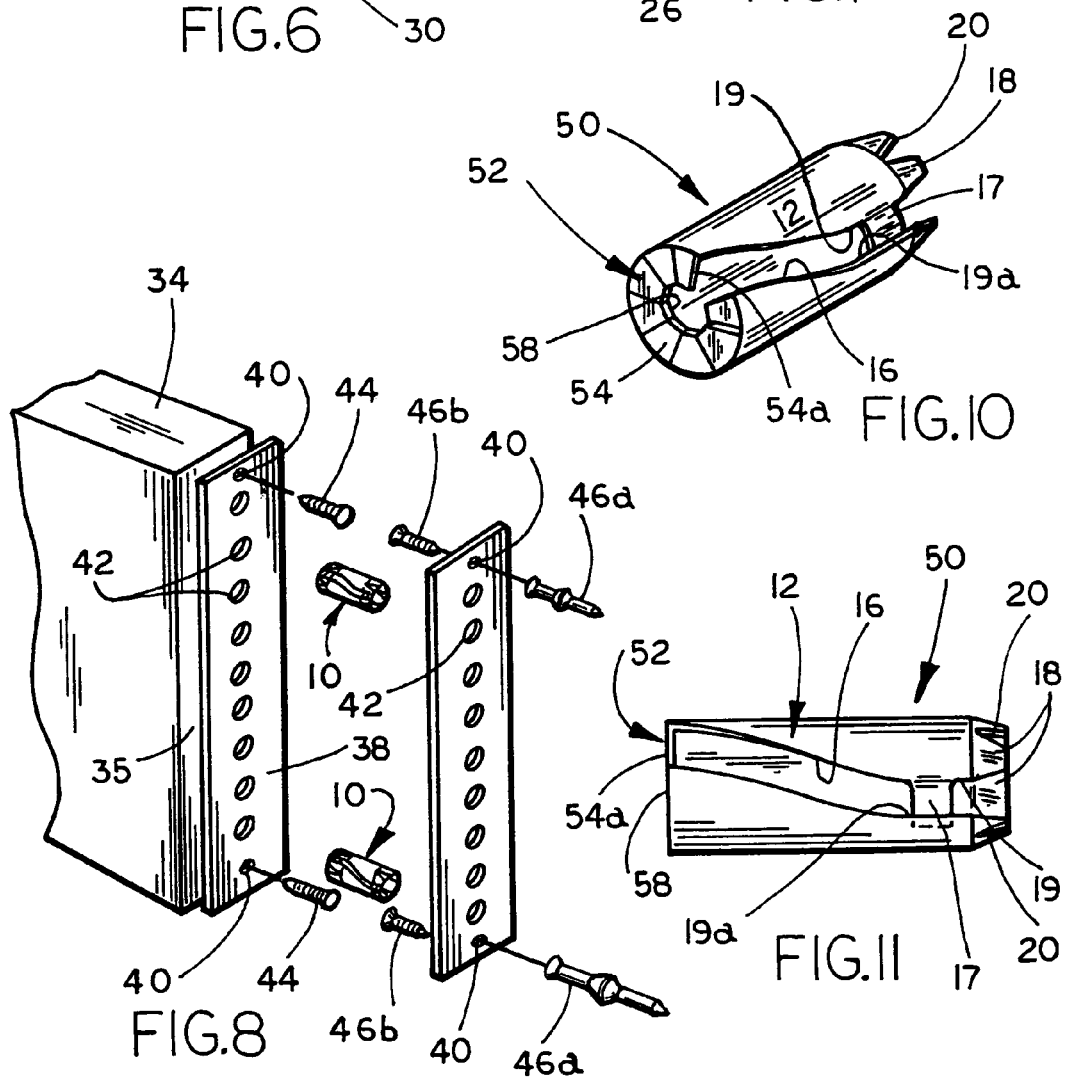

DOWEL FASTENER AND JOINTS INCLUDING SAME

FIELD OF THE INVENTION

This invention relates to frictional type fasteners for joints including joint members of wood, metal, plastic or combinations thereof and, more particularly, to a dowel-type fastener intended for compressive insertion within a recess, aperture or bore for frictionally engaging the sides of the recess, aperture or bore to hold the joint member to another member.

BACKGROUND OF THE INVENTION

Dowel type fasteners for wood and other type joints are well known. In the past, such dowel fasteners have either been solid and used for alignment purposes in conjunction with adhered or glued joints or have been slotted, solid or tubular dowels which frictionally engage the inside surfaces of bores or apertures in the joint members in which they are inserted. Although certain of the prior known slotted dowels or pins have included spiral or helical slots, the vast majority have included rectilinear slots. Such rectilinearly slotted dowels are less than satisfactory for furniture or other joints because, if inserted in a slot or elongated aperture, it is possible that the slot area of the circumference of such dowel could engage the side of the slot or aperture and produce a loose fit and less than satisfactory frictional holding power.

With certain of the prior spiral or helically slotted dowels, difficulty has been encountered during insertion of such dowels between joint members. Many of such dowels have been stiff and inflexible due in part to the material thickness necessary for their strength.

In other dowel fasteners, tapered ends have been provided as an aid to insertion in the joint members. In many of these, the taper was insufficient to allow proper insertion of the relatively stiff dowel into two holes which might be slightly out of alignment in opposing joint members or sufficiently small to obtain a proper frictional hold in softer materials. Further, such tapered ends have often tended to collapse when struck for insertion of the opposite end in a joint structure thereby eliminating the ability to insert the collapsed end into its respective joint member. Where the taper was sufficiently reduced to avoid such collapse, the aperture or bore size with which the stiff slotted dowel could be used was severely limited. In addition, slotted, dowel type fasteners were often inserted in holes or apertures which were undersized thereby causing over compression and collapse of the dowel diameter or splitting of the joint member. Such collapse or deformation was regulated by controlling the bore size even though the dowel itself had no structure to prevent such insertion.

As in improvement over these prior known problems with slotted dowel fasteners for furniture or other joints, the dowel fastener of U.S. Pat. No. 4,474,493 was introduced. While providing solutions for many of the above problems, such improved dowel fasteners often encountered the problem of nesting during manufacture and use. Nesting comprises the telescoping, overlapping reception of the wall of one tubular type dowel such as that shown in U.S. Pat. No. 4,474,493 through the slot of another similar dowel such that two dowels "nest" together in a substantially overlapping concentric assembly which not only prevents proper coating or heat treatment of the surfaces of the dowel when formed from metal, but also prevents the feeding of individual dowels with automatic feeding machines adapted to automatically install the dowels in joints. Even when such dowels are manually inserted, it was often necessary for the operator/installer to "de-nest" or separate two dowels from one another before insertion in the joint. This caused significantly increased assembly time and increased costs.

During use of the dowel fastener of U.S. Pat. No. 4,474,493, a need was also recognized for increased frictional force for joint retention in certain types of joints. Depending on the type and hardness of the wood or other material from which the joint was formed, tight, secure retention of the joint members was difficult, especially with harder woods or metallic materials thereby indicating a need for increased frictional retention force. With dowel fasteners other than those of U.S. Pat. No. 4,474,493, increasing the frictional retention force was difficult because increasing the size or thickness of the material from which the dowels were made greatly increased the difficulty of insertion of the dowels in the joints, limited the size of joints in which the prior known dowel fasteners could be used, or damaged or split the joints during use.

Therefore, the need was recognized for an improved dowel fastener which could offer increased holding power, avoid nesting problems making use in automatic feeding machines difficult or increasing assembly time due to required de-nesting, provide consistent frictional engagement force, be sufficiently flexible and resilient to allow insertion in varying holes or aperture sizes, allow insertion in slightly non-aligned or non-concentric holes or apertures and yet prevent insertion in holes or apertures, that were undersized and would cause plastic deformation or failure of the dowel.

SUMMARY OF THE INVENTION

Accordingly, the present invention provides an improved dowel fastener for compressive insertion within a recess, bore or aperture to frictionally retain one joint member to another. The dowel fastener may be used for wood, metal or plastic joints or joints made from combination of such materials, and includes a flexible, resilient, tubular body having a central axis, an inside surface, an exterior surface, a slot having a predetermined width when the dowel is uncompressed, and two ends at least one of which is tapered, the slot having opposing sides on the tubular body and extending end to end along the dowel. The body includes at least one tab at a first position along the slot, the tab having a free end, a width less than the length of the slot, and a length greater than the slot width at the first position. The tab extends from one edge of the slot across the slot toward the opposing slot edge and engages the inside surface of the tubular body adjacent the opposing slot edge. The body provides a cylindrical, exterior gripping surface for engagement with the sides of the joint apertures and is sufficiently flexible to allow only elastic movement of the sides of the slot toward one another without plastic deformation of the body to reduce the dowel diameter such that the dowel is compressible from its normal, uncompressed diameter for insertion in a smaller fastening aperture while the resiliency of the tubular body and the engagement of the tab with the inside surface of the body resist compression of the dowel. Yet, the dowel fastener is sufficiently resilient for secure frictional engagement of the exterior gripping surface with the sides of the fastening apertures.

In preferred forms of the invention, the slot is a non-linear, spiral slot, while the tapered end includes at least one end flange formed in one piece with the body, the end flange extending inwardly toward the central axis at a predetermined angle and forming a circular free end edge of a second diameter less than that of the body. In addition, the body preferably includes a second tab at a second position along the slot spaced from the first position. The second tab also has a free end, a width less than the length of the slot and a length greater than the slot width at the second position. The second tab extends from one edge of the slot across the slot toward the opposing slot edge and engages the inside surface of the tubular body adjacent the opposing slot edge. Preferably, the first and second tabs are located adjacent the two ends of the body, and are offset radially inwardly by approximately the thickness of the dowel material and have a radius of curvature equal to or greater than that of the outer surface of the dowel body for full frictional engagement with the inside surface of the dowel fastener to enhance resistance to compression. Also, the first and second tabs are preferably offset circumferentially along the spiral slot from one another, may be formed on opposing slot edges such that the two tabs extend generally in opposite directions, and may be formed on slot edge portions which are parallel to the central axis such that the tabs extend generally perpendicular to the central axis.

In other preferred aspects of the invention, a friction enhancing coating, such as phosphate, preferably a coarse phosphate having a consistency of fine sandpaper, may be applied to the exterior surface of the tubular body and tabs to enhance frictional holding power of the dowel fastener.

Further, in certain embodiments, the diameter of the free end edge of the tapered end or ends of the dowel fastener may be made sufficiently large to prevent insertion of the dowel via its tapered end or ends in a fastening aperture, recess or bore which would cause the slot sides to contact one another or be over compressed. In one preferred embodiment, the tapered end or ends prevent insertion of the dowel fastener into recesses, bores or apertures which would cause plastic deformation, fraction or failure of the dowel itself. Alternately, or in addition, portions of the slots sides are adapted to abut one another upon sufficient compression to prevent plastic deformation or failure.

The dowel may preferably be used in at least two embodiments, one embodiment including opposing, tapered ends formed from segmented end flanges, the other embodiment including a substantially planar end having an aperture therethrough, such end extending at a substantially right angle to the central axis such that a fastening member or screw may be received through the aperture to secure the fastener to a surface. The opposite end may then be received in a recess, bore or aperture in the opposite joint member.

The invention also includes joint structures of varying types using the dowel fastener of the present invention. The joints include the type described above as well as others including a substantially rigid, thin securing plate secured to a joint member for receiving the fastener. Each securing plate has an aperture with a diameter less than the normal uncompressed outside diameter of the dowel but no smaller than the diameter of the tapered end. The securing plate is secured with its aperture in alignment with the aperture in the joint member. The dowel is then compressed and received through the securing plate aperture and into the joint member aperture such that the dowel frictionally engages the sides of the aperture in the securing plate and retains the joint members together. Typical joint members can be upstanding panels for office partition purposes, furniture elements, or building walls.

The present dowel fastener provides significant advantages over prior known dowel fasteners. The dowel fastener exhibits improved frictional engagement between its exterior surface and the surface of the wall of its mounting recess aperture or bore due in part to the contact of the tab or tabs from one slot edge engaging the inside surface of the dowel body adjacent the opposing slot edge such that the resiliency of the tab or tabs against the inside body surface resists the compression of the dowel in addition to the normal resiliency and compression resistance of the dowel body. In addition, because of the offset of the tab or tabs radially inwardly, no surface contact is lost between the exterior surface of the dowel fastener and the mounting aperture or hole, such that frictional engagement is maintained and maximized. This frictional holding power may be enhanced through the use of coatings or surface treatments such as the application of phosphate to the exterior surface of the dowel fastener body. Many levels of holding power can be offered by varying the length of the dowel, the thickness of the dowel stock, and the diameter of the mounting recess aperture or hole. Especially by varying the diameter of the mounting recess, aperture or hole, the amount of force required to disassemble the joint can be adjusted as desired.

In addition, the improved dowel fastener of the present invention avoids nesting of one dowel within another dowel such that the dowels are readily usable in automatic feeding machines and can be fully and adequately treated with exterior surface coatings such as the friction enhancing phosphate coating mentioned above without requiring time consuming disassembly or de-nesting processes. The anti-nesting feature of the dowel fastener of the present invention also reduces assembly time when the dowel is manually inserted by avoiding the need for de-nesting operations.

The present dowel is especially well adapted for use in either hard or soft joint members, the latter including softer woods or plastic materials. The holding force can be appropriately adjusted to avoid splitting or opening of the recess or aperture. Significantly, in all type of joints using this dowel, the spiral slot distributes both the weak point of the dowel with respect to applied shear forces on the joint, as well as distributing the "flat" or reduced diameter of the fastener at the slot location so that the problems previously encountered with rectilinearly-slotted dowels or roll pins wherein the straight slot may end up in contact with the sides of the hole or aperture in one or both of the joint members, and thus provide a very loose joint, are avoided.

In addition to the above, the spiral slot in the present invention allows movement of the two opposing edges along the slot in opposite directions parallel to the central axis of the dowel. Thus, when the dowel embodiment having two tapered ends is inserted in a hole, the diameter of the dowel near the noninserted end is several thousandths of an inch larger than the end which is in the hole. Thus, the noninserted end still has compression or holding power for eventual insertion into the mating part. The above advantages also allow the dowel to be used with two joint members having slightly nonaligned or nonconcentric mounting apertures because the present dowel can slightly flex or change direction for insertion in both of the apertures even though they are not completely in registry.

Finally, in certain embodiments of the present invention, destruction, failure or plastic deformation of the present dowel is avoided by the tapered ends which prevent insertion of the dowel into recesses, apertures or bores which are too small and over-compress the dowel. Thus, over compression, fracture and failure of the dowel is avoided. In a preferred embodiment, the taper of the ends of the present invention is also provided at a distinct angle and size such that the free end of the dowel which is struck to drive the opposite end into a joint member will not collapse and prevent insertion into the opposite joint member. Further, in such embodiment, the taper is sufficient, even though strong in the above sense, to allow insertion into a small enough hole to provide sufficient holding power for the joint.

These and other objects, features, purposes and advantages of the invention will become more apparent from a study of the following description taken in conjunction with the drawings.

BRIEF DESCRIPTION OF THE DRAWINGS

FIG. 1 is a perspective view of a first embodiment of the dowel fastener of the present invention;

FIG. 2 is a side elevation of the dowel fastener of FIG. 1;

FIG. 3 is an end elevation of the dowel fastener shown in FIGS. 1 and 2;

FIG. 4 is a sectional end view of the dowel fastener taken along plane IV—IV of FIG. 1;

FIG. 5 is a perspective, exploded illustration of one joint application of the dowel fastener of FIGS. 1–4 for securing parts of a furniture table together;

FIG. 6 is an enlarged, side sectional view of one of the furniture joints of the table of FIG. 5;

FIG. 7 is a top plan view of the joint of FIG. 6;

FIG. 8 is an exploded, perspective view of another type of joint using the dowel fastener of FIGS. 1–4;

FIG. 10 is a perspective view of a second embodiment of the dowel fastener of the present invention;

FIG. 11 is a side elevation of the dowel fastener of FIG. 10;

DESCRIPTION OF THE PREFERRED EMBODIMENTS

Figure 9:
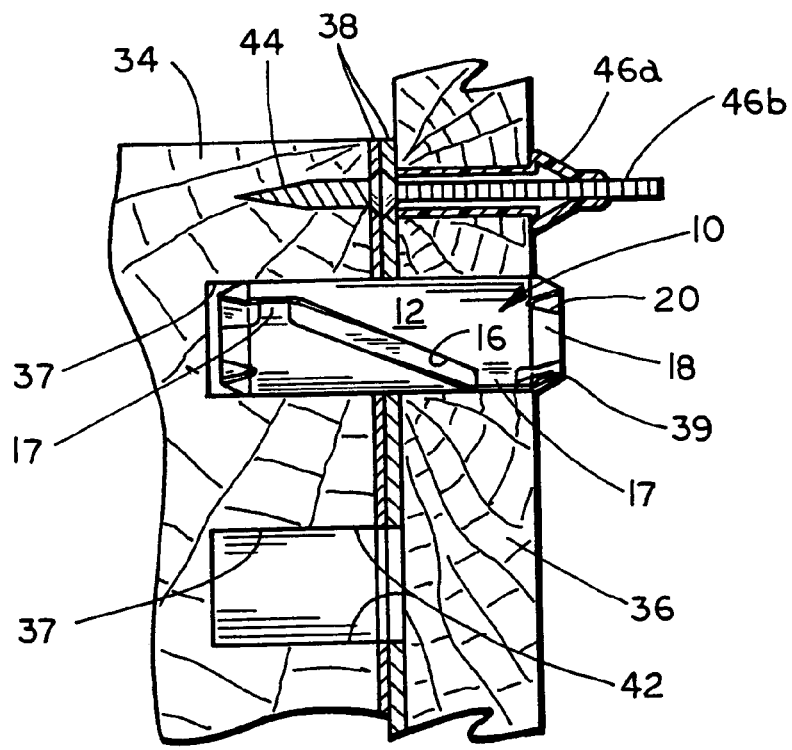
FIG. 9 is a side sectional view of one of the joints of FIG. 8.
Figure 12:
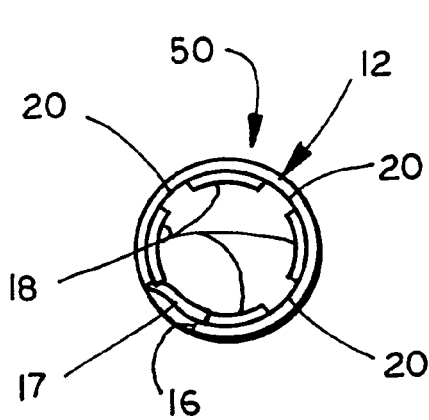
FIG. 12 is an end elevation of the tapered end of the dowel fastener of FIGS. 10 and 11.

Referring now to the drawings in greater detail, FIGS. 1–4 illustrate a first embodiment 10 of the dowel fastener of the present invention. Generally, the dowel fastener of this invention may be formed with identical ends as shown in embodiment 10 and is designed for insertion into recesses, apertures or bores in two opposing joint members. Alternately, it may be formed with one tapered end and one partially closed or flat end as shown in embodiment 50 of FIGS. 10–13 for attachment to a surface or shallow recess via a screw or other fastener and insertion into an aperture, bore or recess in a mating joint part. Both fasteners rely upon frictional engagement of the outer diameter of the dowel with the sides of the recess, aperture or bore for retention purposes. In both cases, the designed ability for compression, the inherent resiliency of the dowel, and the inclusion of one or more tabs extending across the slot of the dowel of this invention, as explained below, create a secure and reliable joint.

As shown in FIGS. 1–4, dowel 10 includes a hollow, substantially uniform, cylindrical, thin walled, tubular body 12 having identical tapered ends 14a, 14b and an angled, spiral slot 16 extending from one end of the dowel to the other. Although slot 16 is shown inclined as a "right handed" directed slot, the concept of this invention would equally encompass "left handed" inclined, or spiral slots. The cylindrical body shape provides effective circumferential joint contact even when compassed as explained below. The entire dowel is preferably stamped and formed in one piece from a strip of spring steel in order to provide it with flexibility and resiliency.

As will be seen by comparing FIGS. 1, 2, 3, and 4, the tapered ends 14a, 14b of dowel 10 include segmented end flanges 18 separated by notches or recesses 20 having rounded bottoms or closed ends at three positions and the spacing of slot 16 at one position. The notches allow proper inward bending of flanges 18 while maintaining their circular shape without bulges. Notches 20 are rounded to better distribute the stress which may focus at the bottom of the notches and thereby prevent stress cracking or failure of the dowel at that point. In addition, the rounded notches tend to avoid gouging of the recess, aperture or bore into which the dowel is inserted. During manufacture, as described below, the outside diameter of the dowel at the position of the notches is carefully controlled to prevent any raised areas or burrs from occurring which would otherwise cause such gouging.

As will be understood from FIG. 2, the segmented end flanges 18 extend inwardly at an angle to the central longitudinal axis of the cylindrical dowel preferably at an angle of 15°±5° as a manufacturing tolerance. In addition, the length of the flanges is determined by the desired outside diameter of the free end edge of the end flanges which forms a partially circular end surface having an outside diameter indicated at $D_2$ in FIG. 2. As will be seen by comparing FIGS. 2 and 3, the outside diameter $D_2$, is less than the outside diameter of $D_1$ (FIG. 3) of tubular body 12. That relationship remains true even when the dowel is compressed and inserted in a joint. However, as will be more fully explained below, in some of the embodiments of the invention, the free end edge diameter, $D_2$, is carefully chosen to be slightly larger than the diameter of a recess, hole or aperture which would cause complete closure of the slot 16. Thus, in this form of the invention, insertion of the dowel into holes or recesses which are too small and which would overcompress and plastically deform or fracture the dowel is avoided.

As will be seen from FIG. 2, angled slot 16 is preferably a non-linear, spiral slot having a helical shape extending from one end of body 12 to the other at an angle preferably within the range of 10°–20°, more preferably at an angle within the range of 12.5°–17.5°, and most preferably at an angle of 15°±5° manufacturing tolerance with respect to the direction of the central axis and the sides of cylindrical dowel. Slot 16 extends through the segmented end flanges to completely separate the dowel to allow compression in the indicated manner. The angular, spiral orientation of the slot effectively distributes and transmits shear forces on the joint when the dowel is in use. There is no single side or area weaker than another. Preferably, the opposing sides of slot 16 are parallel along the length of the spiral slot in body 12. However, during manufacture, when end flanges 18 are bent inwardly to form the tapered ends, the sides of the slot as it extends through the end flanges become non-parallel. Preferably, the dowel is designed for compression only to a point before complete closure of the slot.

In addition, as shown in FIGS. 1–3, body 12 of dowel 10 includes at least one, and preferably two, projections or tabs 17 located at spaced positions along the slot, one adjacent each tapered end of the dowel. Each tab 17 is formed in one piece with the body 12 of dowel 10 preferably on a section 19 of slot 16 which extends parallel to the central axis of the body 12. Preferably, as is best seen in FIG. 4, tab 17 is offset radially inwardly at 17b by the thickness of the spring steel from which body 12 is formed, extends to a free end edge 17a, and has a width less than the length of the slot, and a length greater than the slot width at its respective position. Each tab 17 extends from one edge of the slot, is offset inwardly, preferably by about the thickness of the metal from which body 12 is formed, and extends across the slot toward the opposing slot edge and engages the inside surface of the tubular body adjacent the opposing slot edge as is best seen in FIGS. 1, 2 and 4. The offset of tab 17 allows its outside surface to contact the inside surface of body 12 to help resist compression. Preferably, tab 17 also has a radius of curvature equal to or greater than the radius of curvature of the outside surface or exterior circumference of at least a significant portion of body 12 such that the outside surface of tab 17 pushes against the inside surface of body 12 to resist compression of the body. Each tab extends at an angle preferably perpendicular to the central axis of cylindrical body 12, while the edge portion 19a of slot 16 opposing the position of each tab 17 preferably extends parallel to the central axis and is parallel to slot portion 19 from which tab 17 extends. Because of the spiral shape of slot 16, the positions of tabs 17 are offset circumferentially from one another as shown in FIGS. 1 and 2. Thus, the position of one tab in one joint member is generally not aligned with the position of the other tab in the opposing joint member such that full and secure circumferential engagement of the exterior surface of the dowel body with the joint members is maintained for secure attachment. When combined with the spiral slot, such offset distributes the weak point of the dowel with respect to the shear forces on the joint, as well as distributing the "flat" or reduced diameter of the dowel at the slot location such that loose joints are avoided. In addition, as shown in FIGS. 1 and 2, tabs 17 preferably extend in opposite directions from one another, i.e., one tab 17 extends from one edge of slot 16 toward the opposing edge, while the other tab 17 extends from the opposing edge toward the one edge.

As will also be understood from FIGS. 1–4, the engagement of tabs 17 with the inside surface of the body 12 adjacent the opposing slot edge causes a resistance to compression of the dowel in addition to the normal spring resistance of the dowel body when the dowel is inserted in a joint and compressed. Thus, when the outside diameter of the dowel is decreasing, tabs 17 are forced to bend inwardly and, in doing so, push back against the inside surface of the body 12 thereby resisting compression of the dowel by creating an additional frictional force which aids the retention power and friction fit of the dowel in a joint as compared to prior known dowel fasteners. As mentioned above, the inward offset of tabs 17 prevents the tabs from effecting the circumferential contact of the exterior surface of dowel body 12 with the joint members such that proper frictional engagement of the exterior surface of the dowel body is maintained. In addition, tabs 17 prevent two of the dowel fasteners 10 from nesting within one another when grouped for surface treatment or coating during manufacture, or inserted in an automatic feeding machine, or placed together in a group in a container adjacent a manual assembly position. Tabs 17 prevent the end edge of one dowel from entering the slot 16 and passing along the slot thereby preventing the concentric, telescoping, overlapping assembly of one dowel within the other. This allows proper treatment of the exterior surface during manufacturing treatment processes as explained more fully below, and enables the dowel fastener 10 to be used effectively in automatic feeding machines for automated joint assembly unlike prior known slotted dowel fasteners.

One example of a specific size of dowel 10 which has been found acceptable in joints utilizing wood, plastic or metal joint members has an overall length of 1.250 inches including end flanges 18, an outside uncompressed diameter for body 12 of 0.360 inches, and a slot width of 0.145 inches. The slot extends at a 15°±5° angle to the central axis as mentioned above. The end flanges extend inwardly at an angle of 15°±5°, extend beyond the end of the tubular body by 0.10 inches, and extend inwardly to an outside diameter, $D_2$, at the free end edge thereof of 0.305 inches. The rounded notches 20 are 0.10 inches deep and have side edges extending at an angle of 15°±5° to the central axis. Tabs 17 are preferably 0.165 inches long and 0.125 inches wide. The preferred ratio of stock thickness, preferably 0.018 inches, to tubular body outside diameter, preferably 0.360 inches, for dowel 10 is 0.05, although a thickness to diameter ratio within the range of 0.03 to 0.08 would be acceptable and function properly based on the present understanding of the invention. In addition, end flanges 18 forming the tapered ends on dowel 10 could be angled slightly less if the stock thickness was increased slightly and could be formed as one continuous end flange especially for thicker materials having less taper on their ends. The preferred material is 0.018±0.001 inch thick SAE 1050 spring steel which is annealed and heat treated to a hardness of Rockwell A 70.5 to 73.

In order to enhance the frictional resistance to joint separation and, thus, the holding power of the dowel in a joint, dowel 10 is preferably given a coarse abrasive coating such as phosphate, and especially coarse phosphate. Such a phosphate coating has the consistency of fine sandpaper and enables the dowel to grip the sides of the recesses or apertures within the joint at every position but does not score or gouge the sides of the joint apertures when inserted which could otherwise weaken the joint. Such coatings enhance the ability of dowel 10 to retain the joint tightly together unlike mechanical teeth or projections on an exterior surface of prior known dowels which fail to grip until the joint members are pulled slightly apart.

As shown in FIGS. 5–7, one exemplary joint which can be assembled using the dowel 10 includes a pair of wooden joint members 24, 26 which may be the top and leg from a table or other furniture assembly. The top 24 of the furniture includes elongated slots or recesses 28 routed into the underside thereof and having straight sides spaced apart by a width less than that of the normal, uncompressed outside diameter, $D_1$, of dowel 10. The underside of top 24 of the furniture also includes bored, cylindrical holes 29 spaced from recesses 28 and also each having a diameter less than that of the normal, uncompressed outside diameter $D_1$, of dowel 10. The opposite member 26 includes a pair of spaced, straight sided cylindrical bores 30 also having a diameter less than the normal uncompressed outside diameter $D_1$, and preferably equal to bore 29, that are drilled into the top end edge surface of the leg 26. Slot or recess 28 and bore 29 have depths which are slightly greater than one-third the length of dowel 10 while bores 30 in leg 26 have a depth of slightly greater than approximately two-thirds of the length of dowel 10. Thus, when inserted and compressed therewithin, the dowel will fit approximately one-third into the surface of top 24 without obstruction from the bottoms of slot 28 or bore 29, especially if formed from a relatively hard material, and approximately two-thirds extending into legs 26 without obstruction from the bottom of bores 30, especially if legs 26 are formed from a softer material. If the materials of each top 24 and legs 26 are of similar hardness then the bores and slots can be of approximately equal depth, i.e., slightly greater than about one-half the length of the dowel.

In order to assemble the joint shown in FIGS. 5–7, dowel 10 is first aligned with one of the cylindrical bores 30 such that one of the tapered ends is received in the bore and then driven downwardly until it is either slightly above the bottom of the bore or engages the bottom. Similarly, a second dowel 10 is driven into the other bore 30 in leg 26. Thereafter, top 24 with bore 29 and slot 28 is placed over leg 26 such that the protruding ends of the spaced dowels 10 in bores 30 are aligned with bore 29 and slot 28. Thereafter, top 24 is pressed or driven downwardly until the surfaces of top 24 and leg 26 abut as shown in FIG. 6. Any difference in spacing of bores 30 from that of bore 29 and slot 28 is accommodated because of dowel 10 can be received anywhere along slot 28 for tolerance purposes. During such procedure, the insertion of dowel 10 into bores 29, 30 or slot 28 causes a reduction in diameter and compression of the overall dowel such that the width of slot 16 is reduced as shown in FIG. 6. The natural resiliency of the fastener, as aided by the compression resistance of tabs 17, urges the dowel to expand thereby maintaining tight frictional engagement of the dowel with the sides of the bores and slot to retain the joint members together. It has been found that proper frictional engagement can be maintained with a slot such as that at 28 for some applications, and that a cylindrical bore, although providing a tighter fit, is not required for all joints. The flexibility of the dowel 10 will allow insertion even though the slot 28 and bore 30 are not truly axially aligned. Further, even though one-third to one-half of the dowel is inserted and thus compressed, the other two-thirds to half or end, because of the flexibility and resiliency of the dowel material, remains somewhat uncompressed thereby providing gripping power for the other half of the joint.

For dowel 10 described specifically above, the preferred width of recess 28 or diameter of bore 30 is 0.315 inches. However, it has been found that proper joint retention and operation can be maintained with a range of hole sizes from approximately 0.312 inches to approximately 0.328 inches. Thus, the slot width or bore diameter into which dowel 10 is inserted is somewhat smaller than its normal, uncompressed, outside diameter, $D_1$, although the dowel can fit within a range of hole diameters or widths depending upon the disassembly strength desired.

Referring now to FIGS. 8 and 9, a different joint example using dowel 10 is illustrated. In this joint, a space dividing partition 34 is designed for attachment or joinder to an upstanding wall 36 such as in an office building or the like. Partition 34 includes a vertically extending end edge or face 35. A pair of identical securing plates 38, each formed from a thin, rigid material such as sheet steel, hard plastic or the like, is then secured, one to face 35 of partition 34 and the other to the vertically extending wall surface. Each securing plate 38 includes a securing aperture or apertures 40 for attachment of the plate to a joint member and at least one securing aperture 42 designed for receipt of the dowel 10. As shown in FIGS. 8 and 9, securing plates 38 actually include a plurality or series of aligned securing apertures 42 such that one or more of them may be chosen for insertion of a plurality of dowels 10 for better retention and a more secure joint. In this case, one plate 38 is secured to the vertical end edge of 35 of panel 34 with wood screws 44 while the opposing plate 38 is secured to the surface of wall 36 with appropriate molly fasteners and mating screws 46a, 46b designed for secure attachment in walls formed from dry wall, sheet rock or the like. Thereafter, a drill may be used to bore fastener-receiving apertures 37 in partition 34 or holes 39 through wall 36.

As will now be understood from FIG. 9, when the securing plates 38 are properly secured to the opposing faces of the joint members, dowel 10 is first aligned via one of its tapered ends with aperture 42 in the plate attached to wall 36 and driven inwardly such that approximately one-half of the dowel remains extending from the wall. Thereafter, partition 34 is aligned with the extending dowel 10 such that the dowel extends into one of the securing apertures 42 on the securing plate 38 on face 35 of the partition and the partition is then pressed into place such that it abuts the wall with dowel 10 extending through plate 38 into hole 37 extending behind plate 38 in the partition. Securing apertures 42 in securing plates 38 are sized in a manner similar to that for slot 28 and bore 30 as described above to be smaller than the normal, uncompressed outer diameter $D_1$ of dowel body 12. The principal holding power of the joint comes from the engagement of the exterior of dowel 10 with the sides of apertures 42 through the rigid plates, although some holding power also occurs due to engagement of the dowel with the sides of apertures 37 and 39. Removal of the partition from the wall is allowed by pulling the partition away from the wall with a force greater than the retention force of the dowel or dowel securing the partition to the wall.

As will also be understood, similar joints to that shown in FIGS. 8 and 9 but using a securing plate on only one of the joint members, i.e., partition 34 or wall 36, but not both, are fully possible with this invention. Such joints could be used for securing upholstered panels to chairs or other furniture or the like.

Figure 13:
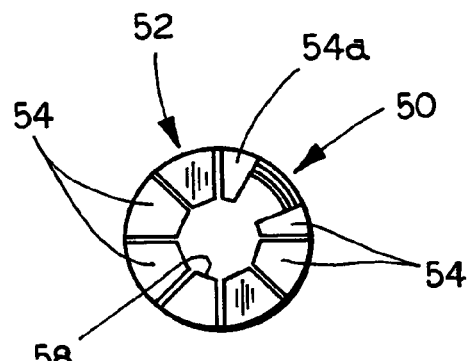
FIG. 13 is an end elevation of the partially closed or flat end of the dowel fastener of FIGS. 10–12.
Figure 14:
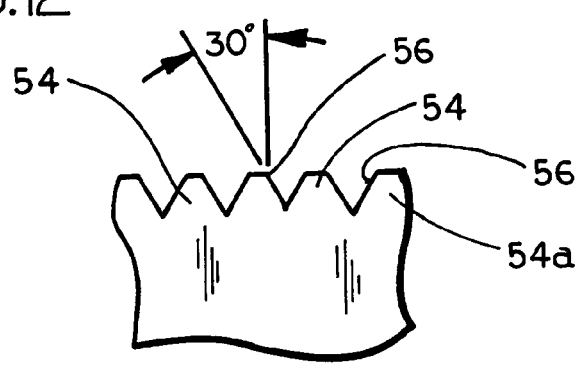
FIG. 14 is a fragmentary view of a stamped blank from which the closed end of the dowel of FIGS. 10–13 is formed.

Referring now to FIGS. 10–13, a second embodiment 50 of the dowel fastener is illustrated. In embodiment 50, like numerals indicate like parts to those in embodiment 10. Embodiment 50 includes a substantially similar, tubular body 12 having one tapered end including segmented end flanges 18 and rounded notches 20 as described above in embodiment 10. In addition, slot 16 extends from the free end edge of flanges 18 along the length of body 12 in an angular or spiral fashion as in embodiment 10. A single tab 17 extends across slot 16 and is offset at 17b from one edge 19. Edge 19 is parallel to the central axis of body 12. Tab 17 extends toward and under opposing slot edge 19a into engagement with the inside surface of body 12. The major difference in embodiment 50 is the inclusion of a substantially planar, semi-closed end 52. End 52 is formed from a plurality, preferably six full sized and two half sized, inwardly extending end flanges 54, 54a which are arranged like flower petals and are narrower than end flanges 18 although also formed in the shape of truncated triangles like flanges 18. End flanges 54 are cut from a flat metal blank with V-shaped notches 56 therebetween in a sawtooth like fashion as shown in FIG. 14. Flanges 54a are substantially one-half the size of flanges 54. As shown in FIGS. 10, 11 and 13, flanges 54, 54a are bent over during formation such that they extend at a right angle to the central axis of the tubular body to define a central fastening aperture 58 through which a securing screw may be passed to secure dowel 50 to a surface or shallow recess for fastening purposes. As shown in FIG. 14, the preferred angle at which the sides of flanges 54, 54a extend to the direction of elongation of those flanges is 30°. Dowel 50 preferably has an outside uncompressed diameter of 0.460 inches. Also, aperture 58 has a minimum inside diameter inside diameter of 0.219 inches to accept a No. 10 screw.

Figure 15:
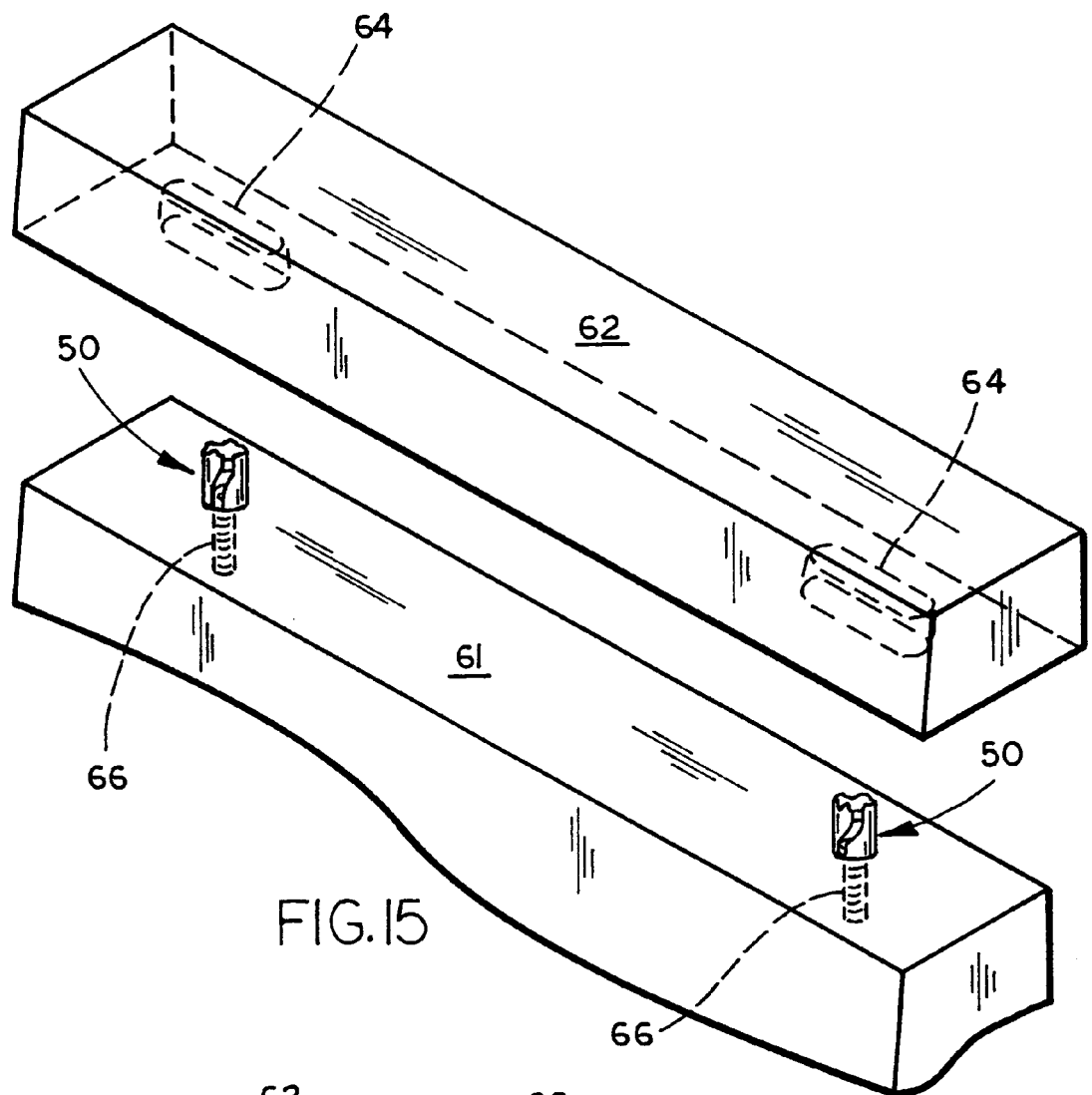
FIG. 15 is an exploded, perspective view of one joint using the dowel fastener of FIGS. 10–13 with a wooden top cap secured to the top surface of an office or space dividing partition.
Figure 16:
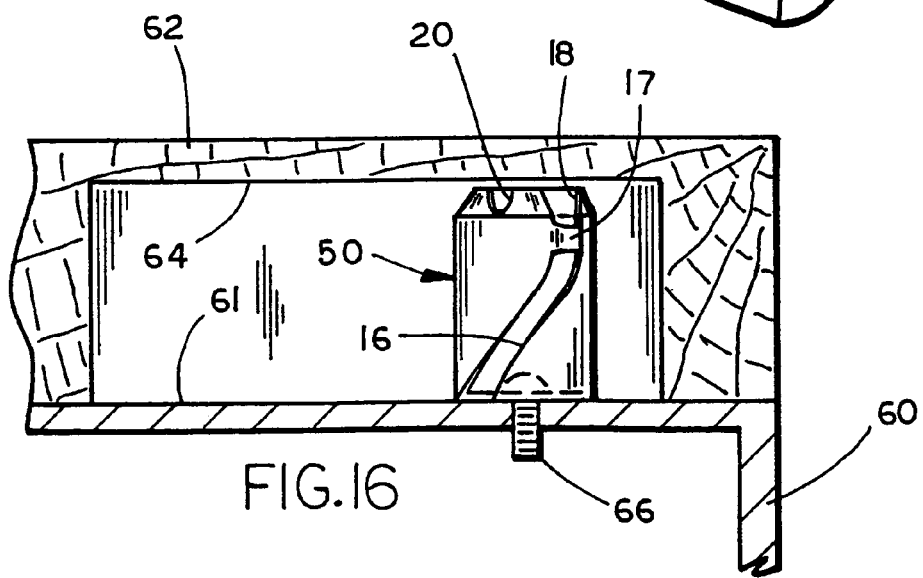
FIG. 16 is a side sectional view of one of the joints of the partition structure of FIG. 15.

As shown in FIGS. 15 and 16, an exemplary joint using dowel 50 is illustrated for joining two joint members including an upstanding office partition or space divider 60 formed from sheet metal or the like and an elongated piece of wooden trim or molding 62. Trim piece or top cap 62 includes a pair of spaced, elongated recesses or slots 64 similar in size and shape to slots 28 in furniture piece 24 and extending into the under surface of the trim piece, parallel to the elongated direction thereof. Slots 64 are preferably used instead of bore holes for greater linear location tolerance. Secured to the horizontal top surface 61 of partition 60 are a pair of semi-closed end dowels 50 of the type described above in connection with FIGS. 10–14. Each dowel 50 has its planar, semi-closed end 52 secured to the top surface 61 by a machine screw 66 extending through aperture 58 and into a tapped hole in metal partition 60. For increased rigidity of dowel 50, it is possible to secure it via semi-closed end 52 in a shallow, circular recess or the like which partially supports the sides of tubular body 12 at the end adjacent semi-closed end 52. As will be seen from FIGS. 15 and 16, dowels 50 project upwardly such that top cap 62 may be pressed downwardly thereover into abutment with partition 60 and adjusted such that the end surfaces are flush via the elongated slots 64. As with the insertion of dowel 10 in the joints described above, the insertion of dowel 50 into slot 64 occurs via the tapered end flanges 18 closing or partially compressing the dowel to a smaller diameter such that it fits within the smaller diameter of slot 64 which has a width determined in accordance with the sizes noted above.

Each of the dowels 10, 50 is manufactured in substantially the same way by cutting a blank generally in the shape of a parallelogram from an elongated strip of sheet spring steel the resulting parallel diagonal lines will form the opposing side edges of slot 16 with tabs 17 projecting therefrom when the blank is later rolled into the shape of the dowel while the parallel side edges of the blank are appropriately notched, either rounded or V-shaped, to form the segmented end flanges 18, 54, 54a when the dowel is formed as set forth below the notches may be punched simultaneously with the cutting of the tabs 17 and diagonal lines across the strip.

After forming the metal parallelogram blank noted above, tabs 17 are offset by the thickness of the blank, and each blank is rolled on a slightly undersized pin or mandrel to form it into a hollow cylinder or tube as noted and with tabs 17 extending under the opposing slot edge. The mandrel or pin is oversized with respect to the overall width of the strip so that the slot will not be closed during formation. However, depending on the type of material and its resiliency, it is sometimes necessary to slightly undersize the pin or mandrel with respect to the desired size of the ultimate slot so that the natural resiliency of the material is accounted for and the slot is the right size after formation. The mandrel may include a clearance area for tabs 17.

At the time the blank is formed around the pin or mandrel, the ends of the dowel are pinched or bent inwardly to form either the tapered ends or the semi closed end. Forming the semi-closed end includes the additional step of bending or pressing flanges 54, 54a at a right angle to the central axis and into a substantially planar end. After such formation, the mandrel or pin around which the dowel is formed can be pulled from inside the dowel through an open end. In order to prevent further cold working of the material, it is sometimes necessary to employ a compressible pin or mandrel which is known in the metal forming industry and may have its diameter reduced for removal purposes. If necessary, the formed tapered end of the dowel through which the mandrel is withdrawn may be re-formed to the desired angle and position.

Thereafter, the formed dowels are heat treated or annealed by heating and oil quenching to a hardness of Rockwell A 70.5 to 73. Subsequently, the abrasive coating, such as coarse phosphate, is applied to the dowels by coating or treatment as is conventionally known. However, when completed, the phosphate coated dowels are dry with no oil present thereby ensuring tight frictional engagement with joint members when installed in a joint. The formed, treated dowels are also tumbled to remove any roughness or burrs which may have resulted from the manufacturing process.

Accordingly, the present improved dowel fastener, in either of its embodiments, provides a secure frictional fastener for retaining two joint members together by compressive insertion within recesses, apertures or bores therein. The dowel is sufficiently flexible and resilient to be insertable in slightly nonaligned or varying size holes, includes a tapered end or ends and/or side portions adapted to abut upon sufficient compression to prevent insertion of the dowel in undersized holes which would fracture or cause plastic deformation of the dowel, provides enhanced force transmission of shear loads on the joint through use of its spiral or angular slot, and yet retains its round, cylindrical shape for proper joint surface engagement. The dowel fastener exhibits excellent frictional retention of joint members due to its resiliency and the resistance to compression of tabs 17 and/or due to the abrasive coating such as phosphate.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. A dowel fastener for compressive insertion within apertures in joint members of wood, metal or synthetic material to form a friction joint without permanent plastic deformation of said dowel fastener, said dowel fastener comprising:

a flexible, resilient, tubular body having a central axis, an inside surface, an exterior surface, a slot having a predetermined width when said dowel fastener is uncompressed, and two ends at least one of which is tapered, said slot having opposing edges on said tubular body and extending from end to end along said dowel fastener;

at least one tab at a first position along said slot, said tab having a free end, a width less than the length of said slot, and a length greater than said slot width at said first position, said tab extending from one edge of said slot across said slot toward said opposing slot edge and engaging said inside surface of said tubular body adjacent said opposing slot edge;

said body providing a cylindrical, exterior gripping surface for engagement with the sides of the joint apertures and being sufficiently flexible to allow only elastic movement of the sides of said slot toward one another without plastic deformation of said body to reduce the dowel fastener diameter such that said dowel fastener is compressible from its normal, uncompressed diameter for insertion in a smaller fastening aperture while the resiliency of the tubular body and the engagement of said tab with said inside surface of said body resist compression of said dowel fastener, said dowel fastener being sufficiently resilient for secure frictional engagement of said exterior gripping surface with the sides of the fastening apertures.

2. The dowel fastener of claim 1 wherein said slot is non-linear.

3. The dowel fastener of claim 2 wherein said slot is a spiral slot.

4. The dowel fastener of claim 3 wherein said tapered end includes at least one end flange formed in one piece with said body, extending inwardly toward said central axis at a predetermined angle, and forming a circular free end edge of a second diameter less than that of said body.

5. The dowel fastener of claim 4 wherein said slot extends through both ends and said end flange.

6. The dowel fastener of claim 3 wherein said tab is offset radially inwardly from said exterior surface of said body.

7. The dowel fastener of claim 6 wherein said dowel fastener is formed from a material having a predetermined thickness; said tab being offset from said exterior surface of said body by about said thickness of said dowel fastener material.

8. The dowel fastener of claim 7 wherein said tab is curved to correspond to the curve of said cylindrical exterior surface, said tab having a radius of curvature of at least one of equal to, and greater than the radius of curvature of said exterior surface of said body.

9. The dowel fastener of claim 3 wherein said one edge of said slot from which said one tab extends at said first position is parallel to said central axis, said one tab extending generally perpendicular to said central axis.

10. The dowel fastener of claim 1 wherein said tab is offset radially inwardly from said exterior surface of said tubular body.

11. The dowel fastener of claim 10 wherein said dowel fastener is formed from a material having a predetermined thickness; said tab being offset radially inwardly from said exterior surface of said body by about said thickness of said dowel fastener.

12. The dowel fastener of claim 10 wherein said tab has a curved shape corresponding to said tubular body.

13. The dowel fastener of claim 12 wherein said tab has a radius of curvature equal to or greater than that of said exterior surface of said tubular body.

14. The dowel fastener of claim 1 including a friction enhancing coating on at least said exterior surface of said tubular body.

15. The dowel fastener of claim 14 wherein said friction enhancing coating comprises phosphate.

16. The dowel fastener of claim 1 wherein said tapered end includes at least one end flange formed in one piece with said body, extending inwardly toward said central axis at a predetermined angle, and fanning a circular free end edge of a second diameter less than that of said body.

17. The dowel fastener of claim 16 wherein said slot has a predetermined width when said dowel fastener is at its normal, uncompressed diameter; said second diameter being sufficiently large to prevent insertion of said dowel fastener via said tapered end in a fastening aperture or bore which would cause said slot to completely close.

18. The dowel fastener of claim 16 wherein said end flange includes a plurality of segments, each segment extending inwardly at said predetermined angle and separated from the adjacent segments by a notch or said slot.

19. The dowel fastener of claim 18 wherein the closed ends of said notches are rounded to reduce cracking or failure of said dowel fastener.

20. The dowel fastener of claim 16 wherein the other of said tubular body ends includes flange means extending inwardly toward said central axis with at least one portion thereof extending at a right angle to said axis; said flange means including a fastener receiving aperture through said one portion for attachment of said dowel fastener to a surface.

21. The dowel fastener of claim 20 wherein said flange means include a plurality of tapered flange segments separated by notches, said flange segments extending in one-piece from said other body end and bent over at a right angle to said central axis such that said bent flange segments form a planar securing flange transverse to said axis, said aperture being centrally located in said securing flange.

22. The dowel fastener of claim 16 wherein said end flange extends at an angle of about 15°±5° to said central axis.

23. The dowel fastener of claim 22 wherein said tubular body material has a thickness of 0.018 inches, said slot has a width of approximately 0.145 inches, the sides of said slot extending at an angle within the range of about 10° to 20° to the direction of said central axis.

24. The dowel fastener of claim 23 wherein said body is a thin-walled tube formed from annealed spring steel, said steel tube having a thickness to diameter ratio within the range of between about 0.03 and 0.08.

25. A friction joint including the dowel fastener of claim 16 and first and second joint members, said joint members each including a bore in a surface thereof having a diameter less than the normal, uncompressed outside diameter of said dowel fastener but no smaller than said second diameter; said dowel fastener being inserted and compressed within each of said bores such that said dowel fastener extends into and frictionally engages the sides of each bore to secure said joint members together.

26. The friction joint of claim 25 wherein each of said bores has a depth of approximately one-third to two-thirds of the length of said dowel fastener;

said dowel fastener extending into each bore a distance of approximately one-third to two-thirds of its length; said joint members abutting one another.

27. A friction joint including the dowel fastener of claim 16, first and second joint members, and at least one securing plate formed from thin, substantially rigid material and having at least one aperture therethrough, said securing plate aperture having a diameter less than the normal, uncompressed, outside diameter of said dowel fastener but no smaller than said second diameter; one of said joint members having at least one dowel fastener receiving aperture in a surface thereof; said securing plate being secured to said one joint member such that said securing plate aperture is in alignment with said aperture in said one joint member; said dowel fastener being compressed and received through said securing plate aperture and into said joint member aperture behind said securing plate; said dowel fastener being secured to the other of said joint members whereby said dowel fastener frictionally engages the sides of said aperture in said securing plate and retains said one joint member to the other joint member.

28. The friction joint of claim 27 wherein one of said joint members is a wall.

29. The friction joint of claim 28 wherein the other of the joint members is an upstanding panel.

30. The friction joint of claim 27 wherein a second securing plate like said one securing plate is secured to said other joint member, said other joint member also including a dowel fastener-receiving aperture aligned with the securing plate aperture in said second securing plate; said dowel fastener being received in said aperture in said second securing plate and into said aperture in said other joint member.

31. A friction joint including the dowel fastener of claim 16 and first and second joint members, at least one of said joint members including a fastener-receiving recess in a surface thereof having a width less than the normal, uncompressed outside diameter of said dowel fastener but no smaller than said second diameter;
said dowel fastener being secured to the other of said joint members and inserted and compressed within said recess in said one joint member such that said dowel fastener extends into and frictionally engages the sides of said recess to secure said joint members together.

32. The friction joint of claim 31 wherein said recess is elongated and has parallel sides.

33. The friction joint of claim 31 wherein said recess is a cylindrical bore.

34. The friction joint of claim 31 wherein both said joint members include at least one of said fastener-receiving recesses; said dowel fastener being inserted and compressed within and frictionally engaging the sides of both said recesses to secure said joint members together.

35. A dowel fastener for compressive insertion within apertures in joint members of wood, metal or synthetic material to form a friction point without permanent plastic deformation of said dowel fastener, said dowel fastener comprising:
a flexible, resilient, tubular body having a central axis, an inside surface, an exterior surface, a non-linear, spiral slot having a predetermined width when said dowel fastener is uncompressed, and two ends at least one of which is tapered, said slot having opposing edges on said tubular body and extending from end to end along said dowel fastener;
at least one tab at a first position along said slot, said tab having a free end, a width less than the length of said slot, and a length greater than said slot width at said first position, said tab extending from one edge of said slot across said slot toward an opposing slot edge and engaging said inside surface of said tubular body adjacent said opposing slot edge;
a second tab at a second position along said slot, said second position being spaced from said first position, said second tab having a free end, a width less than the length of said slot, a length greater than said slot width at said second position, and extending from one edge of said slot across said slot toward said opposing slot edge and engaging said inside surface of said tubular body adjacent said opposing slot edges;
said body providing a cylindrical, exterior gripping surface for engagement with the sides of the joint apertures and being sufficiently flexible to allow only elastic movement of the sides of said slot toward one another without plastic deformation of said body to reduce the dowel fastener diameter such that said dowel fastener is compressible from its normal, uncompressed diameter for insertion in a smaller fastening aperture while the resiliency of the tubular body and the engagement of said tabs with said inside surface of said body resist compression of said dowel fastener, said dowel fastener being sufficiently resilient for secure frictional engagement of said exterior gripping surface with the sides of the fastening apertures.

36. The dowel fastener of claim 35 wherein said first position of said one tab is adjacent one end of said body, and said second position of said second tab is adjacent the second of said two ends of said body.

37. The fastener of claim 36 wherein said second position of said second tab is offset circumferentially along said spiral slot from said first position of said one tab.

38. The dowel fastener of claim 35 wherein both ends of said body are tapered.

39. The dowel fastener of claim 38 wherein said tubular body has a first diameter, both of said tapered ends being tapered inwardly to a size smaller than said first diameter.

40. The dowel fastener of claim 39 wherein each of said tapered ends includes at least one end flange formed in one piece with said body, extending inwardly toward said central axis at a predetermined angle, and forming a circular free end edge of a second diameter less than that of said body.

41. The dowel fastener of claim 35 wherein said respective edges of said slot from which said one and said second tabs extend each extend parallel to said central axis, each of said one and said second tab extending generally perpendicular to said central axis.

42. The dowel fastener of claim 35 wherein said one and second tabs respectively extend from opposite edges of said slot in generally opposite directions.

43. The dowel fastener of claim 35 wherein said tab at said first position and said second tab are each offset radially inwardly from said exterior surface of said tubular body.

44. The dowel fastener of claim 43 wherein said dowel fastener is formed from a material having a predetermined thickness; each of said tabs being offset radially inwardly from said exterior surface of said body by about said thickness of said dowel fastener material.

45. The dowel fastener of claim 43 wherein each of said tabs has a curved shape corresponding to said tubular body.

46. The dowel fastener of claim 45 wherein each of said tabs has a radius of curvature equal to or greater than that of said exterior surface of said tubular body.

47. A dowel fastener for compressive insertion within apertures in joint members of wood, metal or synthetic material to form a friction joint without permanent plastic deformation of said dowel fastener comprising:
a flexible, resilient, hollow, cylindrical body having a central axis, opposing ends and a predetermined uncompressed diameter; said cylindrical body providing an exterior gripping surface for engagement with the sides of a joint aperture;
a slot extending angularly along said body for allowing only elastic flexing movement of said body for compressing said dowel fastener to smaller diameters for insertion in smaller diameter apertures or bores of joints;
at least one tab at a first position along said slot, said tab having a free end, a width less than the length of said slot, and a length greater than a slot width at said first position, said tab extending from one edge of said slot across said slot toward an opposing slot edge and engaging an inside surface of said cylindrical body adjacent said opposing slot edge;
an end flange on at least one end of said body providing a taper for inserting and compressing said dowel fastener within a smaller diameter joint bore or aperture; said end flange extending at a predetermined inward angle to said central axis and terminating at a free, curved end edge having a diameter less than said body diameter.

48. The dowel fastener of claim 47 wherein said slot is a spiral slot.

49. The dowel fastener of claim 47 wherein said tab is offset radially inwardly from said exterior surface of said cylindrical body.

50. The dowel fastener of claim 49 wherein said dowel fastener is formed from a material having a predetermined thickness; said tab being offset radially inwardly from said exterior surface of said body by about said thickness of said dowel fastener material.

51. The dowel fastener of claim 49 wherein said tab has a curved shape corresponding to said cylindrical body.

52. The dowel fastener of claim 51 wherein said tab has a radius of curvature equal to or greater than that of said exterior surface of said cylindrical body.

53. The dowel fastener of claim 47 including a friction enhancing coating on at least said exterior surface of said cylindrical body.

54. The dowel fastener of claim 53 wherein said friction enhancing coating comprises phosphate.

55. The dowel fastener of claim 47 wherein said end flange is included on both of said opposing body ends to facilitate insertion of said dowel fastener in opposing bores or apertures of opposing joint parts.

56. The dowel fastener of claim 55 wherein said end flange includes a plurality of flange segments, each segment extending inwardly at said predetermined angle to said central axis and separated from the adjacent segments by a notch or said slot.

57. The dowel fastener of claim 56 wherein said other end of said tubular body includes means for securing said dowel fastener to a surface such that it extends upwardly therefrom with its one tapered end free for insertion in a recess, bore or aperture of a separate joint member.

58. The dowel fastener of claim 47 wherein the other of said tubular body ends includes a flange for attachment of said dowel fastener to a surface extending inwardly toward said central axis with at least one portion thereof extending at a right angle to said axis; said flange including a fastener-receiving aperture through said one portion.

59. The dowel fastener of claim 58 wherein said flange includes a plurality of tapered flange segments separated by notches, said flange segments extending in one-piece from said other body end and bent over at a right angle to said central axis such that said bent flange segments form a planar securing flange transverse to said axis, said aperture being centrally located in said securing flange.

60. The dowel fastener of claim 47 wherein said slot includes spaced, parallel side edges, said side edges extending in a spiral path along said body from one of said opposing ends to the other and extending through said end flange such that said side edges are completely separated.

61. A dowel fastener for compressive insertion within apertures in joint members of wood, metal or synthetic material to form a friction joint without permanent plastic deformation of said dowel fastener comprising:

a flexible, resilient, hollow, cylindrical body having a central axis, opposing ends and a predetermined uncompressed diameter; said cylindrical body providing an exterior gripping surface for engagement with the sides of a joint aperture;

a spiral slot extending angularly along said body for allowing only elastic flexing movement of said body for compressing said dowel fastener to smaller diameters for insertion in smaller diameter apertures or bores of joints;

at least one tab at a first position along said slot, said tab having a free end, a width less than the length of said slot, and a length greater than a slot width at said first position, said tab extending from one edge of said slot across said slot toward an opposing slot edge and engaging an inside surface of said cylindrical body adjacent said opposing slot edge;

a second tab at a second position along said slot, said second position being spaced from said first position, said second tab having a free end, a width less than the length of said slot, a length greater than said slot width at said second position, and extending from one edge of said slot across said slot toward an opposing slot edge and engaging an inside surface of said cylindrical body adjacent said opposing slot edge; and an end flange on at least one end of said body providing a taper for inserting and compressing said dowel fastener within a smaller diameter joint bore or aperture; said end flange extending at a predetermined inward angle to said central axis and terminating at a free, curved end edge having a diameter less than said body diameter.

62. The dowel fastener of claim 61 wherein said first position of said one tab is adjacent one end of said body, and said second position of said second tab being adjacent the second of said two ends of said body.

63. The dowel fastener of claim 61 wherein both ends of said body are tapered.

64. The dowel fastener of claim 63 wherein said cylindrical body has a first diameter, both of said tapered ends being tapered inwardly to a size smaller than said first diameter.

65. The dowel fastener of claim 61 wherein said one and second tabs respectively extend from opposite edges of said slot in generally opposite directions.

66. The fastener of claim 61 wherein said second position of said second tab is offset circumferentially along said spiral slot from said first position of said one tab.

* * * * *

UNITED STATES PATENT AND TRADEMARK OFFICE
CERTIFICATE OF CORRECTION

PATENT NO. : 6,991,397 B2 Page 1 of 1
APPLICATION NO. : 10/704450
DATED : January 31, 2006
INVENTOR(S) : Montgomery J. Welch It is certified that error appears in the above-identified patent and that said Letters Patent is hereby corrected as shown below:

<u>Column 13:</u>
Line 58, Claim 16, "fanning" should be --forming--.

<u>Column 15:</u>
Line 33, Claim 35, Insert --point-- after "joint".
Line 57, Claim 35, "edges" should be --edge--.

Signed and Sealed this

Second Day of January, 2007

JON W. DUDAS
*Director of the United States Patent and Trademark Office*